(12) United States Patent
Sundararajan et al.

(10) Patent No.: US 11,686,709 B2
(45) Date of Patent: Jun. 27, 2023

(54) EVALUATING AND EXCHANGING BATTERIES

(71) Applicant: International Business Machines Corporation, Armonk, NY (US)

(72) Inventors: Mukundan Sundararajan, Bangalore (IN); Saikat Mukhopadhyay, Kolkata (IN); Sanmitra Sarkar, Kolkata (IN); Sujay Nandi, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 17/207,930

(22) Filed: Mar. 22, 2021

(65) Prior Publication Data

US 2022/0299478 A1    Sep. 22, 2022

(51) Int. Cl.
*G01N 29/11* (2006.01)
(52) U.S. Cl.
CPC ....... *G01N 29/11* (2013.01); *G01N 2291/044* (2013.01); *G01N 2291/2698* (2013.01)
(58) Field of Classification Search
CPC ............. G01N 29/11; G01N 2291/044; G01N 2291/2698
See application file for complete search history.

(56) References Cited

U.S. PATENT DOCUMENTS

| 5,612,606 | A | 3/1997 | Guimarin et al. |
| 2016/0349330 | A1 | 12/2016 | Barfield et al. |
| 2018/0164383 | A1* | 6/2018 | Hsieh ..................... B60L 3/0046 |
| 2019/0207274 | A1 | 7/2019 | Ladpli et al. |
| 2019/0207397 | A1* | 7/2019 | Lai ........................... B60L 53/80 |
| 2020/0106137 | A1 | 4/2020 | Murphy et al. |
| 2021/0350818 | A1* | 11/2021 | Biswas .................. G01N 29/07 |

OTHER PUBLICATIONS

Ding, "A Battery Health Data Sharing Model via Blockchain" (Year: 2018).*
Chang et al., "Real-time measurement of lithium-ion batteries' state-of-charge based on air-coupled ultrasound," AIP Advances, vol. 9, Issue 8, Aug. 20, 2019, 4 pages, https://aip.scitation.org/doi/10.1063/1.5108873.
Zhang et al., Ultrasound-assisted Hydrothermal Renovation of LiCoO2 from the Cathode of Spent Lithium-ion Batteries, International Journal of Electrochemical Science, vol. 9, Apr. 14, 2014, 10 pages, http://www.electrochemsci.org/papers/vol9/90703691.pdf.
Ladpli et al., "Estimating Lithium-ion Battery State of Charge and Health with Ultrasonic Guided Waves Using an Efficient Matching Pursuit Technique," ResearchGate, 2018 IEEE Transportation Electrification Conference and ExpoJun. 2018, 9 pages, DOI: 10.1109/ITEC-AP.2018.8433297.

(Continued)

*Primary Examiner* — Xin Y Zhong
(74) *Attorney, Agent, or Firm* — Grant M. McNeilly (57) ABSTRACT

A battery is subjected to ultrasound waves, and resulting re-emitted ultrasound waves are recorded. Based upon how the waves are distorted or reflected, a state of pores within the battery can be evaluated. This evaluation can be used to verify a rating of the battery included in received data regarding the battery.

20 Claims, 6 Drawing Sheets

(56) References Cited

OTHER PUBLICATIONS

Kasroui, "Rachid Yazami Invents Method to Detect Battery Short Circuits, Save Lives," Morocco World News, Jun. 1, 2020, 7 pages, https://www.moroccoworldnews.com/2020/06/304491/rachid-yazami-invents-method-to-detect-battery-short-circuits-save-lives/.

Smart, "Battery Electric Vehicle Driving and Charging Behavior Observed Early in The EV Project," ResearchGate, SAE International Journal of Alternative Powertrains, Jul. 2012, 8 pages, https://www.researchgate.net/publication/254999598.

Liu et al., "A charging method for electric vehicle using multi battery series mode," ARXIV, Printed Mar. 17, 2021, 5 pages, https://arxiv.org/ftp/arxiv/papers/1705/1705.06234.pdf.

Adegbohun et al., "Autonomous Battery Swapping System and Methodologies of Electric Vehicles," MDPI Energies, Feb. 19, 2019, 14 pages, https://www.mdpi.com/1996-1073/12/4/667/htm.

Al-Karakchi et al., "A Method of Electric Vehicle Charging to Improve Battery Life," ResearchGate, Sep. 2015, 4 pages, DOI: 10.1109/UPEC.2015.7339846, https://www.researchgate.net/publication/281741822_A_Method_of_Electric_Vehicle_Charging_to_Improve_Battery_Life.

Mohamed, "Ultrasound test echoes with battery charge," Research Chemistry World, Apr. 21, 2015, 4 pages, https://www.chemistryworld.com/news/ultrasound-test-echoes-with-battery-charge/8462.article.

Wu, et al., "Ultrasonic Health Monitoring of Lithium-Ion Batteries," MDPI Electronics, Jul. 3, 2019, 16 pages, https://www.researchgate.net/publication/334221943.

Roman, "Blockchain Battery Recycling: on track for a circular economy," Everledger IO, 9 pages https://www.everledger.io/blockchain-battery-recycling-on-track-for-a-circular-economy/.

Florea et al., "Blockchain IoT for Smart Electric Vehicles Battery Management," MDPI Sustainability, May 13, 2020, 25 pages, https://www.mdpi.com/2071-1050/12/10/3984.

\* cited by examiner

EVALUATING AND EXCHANGING BATTERIES

BACKGROUND

The systems and methods of the present disclosure relate to electric batteries.

Electric vehicles (EVs) are becoming increasingly commonplace on the consumer market. While traditional internal combustion engine (ICE) vehicles rely on burning a fuel (such as gasoline or diesel fuel) for energy, typical EVs function using electric motors powered by batteries. Analogous to how refueling stations (such as commercial gas stations) sell fuel for ICE vehicles, many refueling stations also include an apparatus to enable EVs to recharge their batteries.

SUMMARY

Some embodiments of the present disclosure can be illustrated as a method. The method comprises receiving available battery data. The available battery data includes a rating of a battery. The rating describes a state of pores in the battery. The method further comprises verifying the state of pores of the first battery via ultrasonic testing.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may be configured to execute instructions to perform the method discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to evaluate batteries and perform an automated exchange of equivalent batteries. More particular aspects relate to a system to evaluate status of an owned battery, identify a candidate replacement battery, evaluate the candidate replacement battery, and automatically exchange the owned battery for the candidate replacement battery.

Electronic Vehicles (EVs) are becoming increasingly commonplace. Accordingly, EV recharging stations are also being introduced, analogous to refueling stations for Internal Combustion Engine (ICE) vehicles. These recharging stations enable an EV user to recharge an EV's batteries without returning the EV to the user's own home or place of business. However, while recharge times are also improving with the introduction and implementation of various "fast charging" techniques, a full recharge of a typical EV can still take ten or more minutes, which is substantially longer than ICE vehicles require to refuel (sometimes 10 times longer). In order to circumvent the discrepancy between EV recharging and ICE refueling, batteries can be exchanged at a station, rather than (or in addition to) recharged. In other words, rather than wait 10 minutes to recharge an EV's batteries, the EV's user may instead exchange the EV's depleted batteries for fully-charged batteries held by the "recharging" station. The station may then recharge those depleted batteries over time, later exchanging the recharged batteries for depleted batteries of a different EV, and so on. This exchange process can be significantly faster to an EV operator than recharging at a recharging station, making it particularly desirable to many EV users. Networks of battery replacement stations thus may be enabled, similar to refueling stations.

However, the concept of exchanging one's batteries for used batteries owned by a third party has its own challenges, even outside the context of EVs. In short, batteries are not always fully fungible; as batteries degrade with use, even batteries of the same model are not identical. In order to address the inherent uncertainty in exchanging batteries, systems and methods consistent with the present disclosure enable evaluation of candidate batteries to determine that an exchange is "fair."

Newer, more modern batteries generally have increased capacity, meaning they can store additional electrical charge. Further, while even modern rechargeable batteries still degrade over time and with use, longevity is also increasing relative to older batteries. Batteries are often described as having a "life cycle"—a battery's "life" refers to the extent of its operational usefulness, such as from its first usage until its performance degrades to the point of needing to be replaced.

Battery performance may remain more or less consistent for the majority of a battery's life. While this is advantageous for applications that utilize the same battery for its entire life, this simultaneously introduces risk into acquisition of "used" batteries. For example, a first used battery may have been heavily utilized and nearing the end of its lifetime while a second used battery may only have been briefly and lightly used. Both batteries may still perform comparably (in terms of capacity, recharge rate, and the like) and thus appear to be relatively equivalent, but the first battery is likely to reach its end-of-life deterioration much faster than the second battery.

Most batteries comprise one or more "cells," wherein each cell includes a positive electrode ("cathode") and a negative electrode ("anode"). In modern batteries, a separator is placed between the cathode and anode. Many batteries utilize a porous membrane as a separator. The pores in this membrane are necessary to allow ions to move between the electrodes. As the battery is discharged (and recharged) over time, the pores tend to degrade, or "fray," becoming larger and eventually resulting in reduced battery performance. This is a significant limiting factor on the lifespan of a battery, and thus the state of a battery's pores would be a useful indicator of the battery's overall health. However, evaluating the state of the pores by current methods generally involves disassembling the battery, which effectively destroys the battery. Thus, a non-destructive way to evaluate the pores of a battery would be advantageous, particularly in the context of evaluating batteries offered for exchange.

Systems and methods consistent with the present disclosure enable utilizing ultrasound techniques, in combination with machine learning models, to determine a state of the pores of a battery. Throughout this disclosure, unless stated otherwise, the term "model" is used to refer to a machine learning model. As an overview, ultrasonic testing involves subjecting an object (in this case, a battery) to sound waves outside the range of human hearing (known as "ultrasound" waves). The ultrasound waves pass into an object, are re-emitted, and are recorded. The re-emitted waves may have been reflected, diffracted, refracted, and/or otherwise distorted by the object. As the ultrasound waves pass into and/or through the object, they are distorted based upon properties of the object. For example, the ultrasound waves travel at different speeds depending upon properties of the material through which they travel, particularly the material's "acoustic impedance." In other words, a material's acoustic impedance will dictate how sound waves will behave as they propagate through the material. Also, when waves encounter edges or borders between materials of different acoustic impedances, reflection waves are produced (although the "original" waves also continue to propagate through).

As an example, an object may consist of two materials; an outer "shell" consisting of a first material having a first acoustic impedance surrounding an inner "core" of a second material having a second acoustic impedance. An ultrasonic wave may be emitted by an external speaker. The wave (referred to in this example as the "original" wave) may be directed toward the object. When the original wave encounters the exterior of the object, a first reflection wave is produced, but the original wave also continues into and propagates through the shell of the object. The direction of the first reflection wave may depend upon the shape of the exterior of the object. When the original wave encounters a border or transition from the shell to the core (i.e., the first material to the second material), a second reflection wave is produced. In a similar manner, the direction of the second wave depends, in part, upon the shape of the border. However, the original wave continues into and propagates through the core of the object. Additional reflection waves are produced as the original wave encounters the border between the core and the shell (e.g., on the other side of the core relative to where it entered) and when it exits the shell (and thus exits/is emitted by the object). These re-emitted waves can be measured by an external microphone.

In order to determine the state of pores of a battery, the battery is subjected to ultrasound waves. The ultrasound waves, upon encountering the battery's separator, will naturally be reflected and distorted. In particular, as the separator has pores in it, diffraction effects will be produced; portions of an ultrasound wave encountering the pores will be reflected and distorted differently than the portions of the wave encountering solid parts of the separator. In the interest of brevity, an ultrasound wave being reflected by a perimeter defining a "pore" is referred to herein as the wave being reflected by the pore itself. Further, more frayed/degraded pores reflect the waves differently than newer, more regular pores. The reflected waves then exit the battery (e.g., are naturally re-emitted by the battery). In other words, a pattern of re-emitted ultrasound waves depends upon the state of the pores of the battery.

As a simplified example, a battery having pores in a factory new state may re-emit ultrasound waves at nearly the same frequency and amplitude. To illustrate, an ultrasonic signal including waves at 28,000 Hz may be emitted at a first battery, the first battery having undamaged pores. The ultrasound waves re-emitted by the first battery may be recorded and measured to have frequencies ranging from 27,980 Hz to 28,030 Hz. A similar ultrasonic signal may be emitted at a second battery, the second battery having significantly deteriorated pores. The ultrasound waves re-emitted by the second battery may be recorded and measured to have frequencies ranging from 24,000 Hz to 30,000 Hz. The wider range of frequencies in the second set of re-emitted ultrasound waves may indicate that the ultrasound waves are being distorted more by the second battery, thus implying that the second battery's pores are in a more degraded state relative to the first battery's pores. In addition, the first set of waves may resemble the initial ultrasonic signal more closely than the second set of waves. For example, the initial ultrasonic signal may be a simple sine wave. The waves re-emitted by the first battery may be a slightly distorted sine wave, including relatively minor aberrations. In contrast, the waves re-emitted by the second battery may be more distorted from the original sine wave, such as by including additional signals at varying frequencies, etc. Thus, the re-emitted ultrasound waves, when measured and evaluated, can provide insight on the state of the pores of the battery.

Different manufacturer models of battery may have different baseline re-emitted wave patterns. As an example, a manufacturer may produce one hundred batteries of a first model, such as a standard 12V automotive battery, and one hundred batteries of a second model, such as a common 9V battery. A first automotive battery, a second automotive battery, and a third 9V battery may all have been recently manufactured and thus may all have pores in a pristine state. The three example batteries may each be subjected to the same ultrasound waves, and re-emitted waves may be recorded for analysis. As the first and second batteries are both of the same manufacturer model (i.e., are both common 12V automotive batteries) and have pores of the same quality (i.e., factory new), the first and second batteries may have similar re-emitted wave patterns. However, as the third battery is of a different manufacturer model (even if it was produced by the same manufacturer), the re-emitted wave patterns measured when testing the third battery may be substantially different from the re-emitted wave patterns measured when testing the first and second batteries. Thus, the relationship between ultrasound measurement and pore state may need to be determined for specific manufacturer models of battery.

In developing the relationship between ultrasound measurement and pore state for a given battery manufacturer model, a developer (such as a manufacturer of the battery or a third-party battery modeling entity) may take ultrasonic measurements of a first battery, disassemble the first battery and evaluate the state of the first battery's pores, take ultrasonic measurements of a second battery of the same manufacturer model as the first battery, disassemble the second battery and evaluate the state of the second battery's pores, and repeat until a reliable machine learning model is established for that manufacturer model of battery. This machine learning model can be released alongside the battery. For example, a manufacturer could make the model publicly available via a website. Upon purchase of a battery, the appropriate model could be downloaded by the purchaser. In some instances, the model could be licensed (for a fee) to users, offered to certified testing services, etc. In addition or alternatively, third parties may develop (or verify) these models by performing their own tests.

Figure 1:
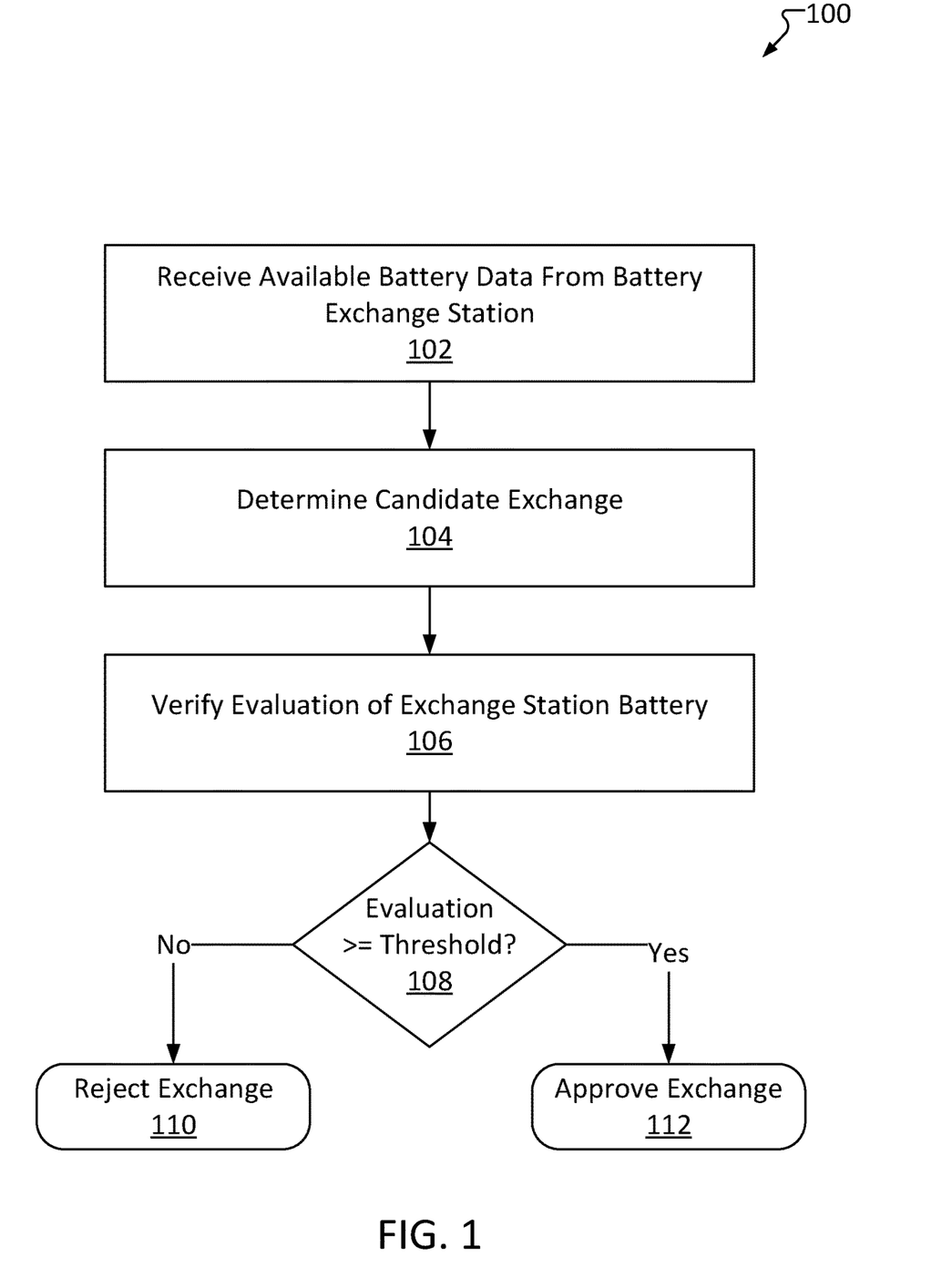
FIG. 1 is a high-level method for performing an automated battery exchange, consistent with several embodiments of the present disclosure.

FIG. 1 is a high-level method 100 for performing an automated battery exchange, consistent with several embodiments of the present disclosure. Method 100 may be performed by an electronic vehicle (EV). As an example, an EV may have a scheduled journey to drive from a first location (e.g., a user's home) to a second location (e.g., a bank), and back to the first location. The EV may determine that a charge level of its batteries is insufficient to complete the journey (possibly based on some safety margin; e.g., the journey would bring the charge level of the batteries below an acceptable threshold). This determination may be made based upon a planned route of the journey, traffic estimations, the user's driving history, etc. In response, the EV may perform method 100 during the journey in order to exchange batteries with a battery exchange station and thus complete the journey. The EV may perform method 100 in lieu of (or in addition to) recharging the EV's batteries. The battery exchange station may be a commercial or public (e.g., government-run) entity offering batteries for exchange. For example, an existing gasoline refueling station or battery recharging station may be modified to include or function as a battery exchange station. The EV may select the battery exchange station from a number of available exchange stations based on proximity to planned route, user preferences, prices, etc.

Method 100 comprises receiving available battery data from an exchange station at operation 102. Operation 102 may include, for example, receiving a list of the exchange station's batteries that are eligible or otherwise available for exchange. The data received at operation 102 may include ratings of the available batteries. The ratings may include, for example, a number of charge cycles, pore status, a distance traveled (e.g., in miles, kilometers, etc.), an age, a current charge, and the like. The data may be in a blockchain so as to impede modification of the data (and thus increase reliability). Operation 102 may be performed in response to a query submitted to the exchange station.

As an example, an EV may transmit a query (via a network, such as the Internet) to a database owned by a battery exchange station proprietor. The query may include a request for information on eligible batteries. In response, the EV may receive a list of batteries available at the battery exchange station. The list may include a first exchange station battery as well as a first rating of the first exchange station battery. The first rating may indicate that the first exchange station battery currently has a 100% charge, has travelled for 60,000 miles, and has pores in a "B-grade" state (meaning the pores have undergone slight fraying/deterioration). The list may also include a second exchange station battery as well as a second rating of the second exchange station battery. The second rating may indicate that the second exchange station battery currently has a 100% charge, has travelled for 10,000 miles, and has pores in an "A-grade" state (meaning the pores are like-new). The list may include similar information regarding all batteries available at the battery exchange station. In some embodiments, a battery may be reserved by a user, wherein the exchange station may refuse to exchange it with a party other than the reserving user. The reservation may have a set duration such as, for example, 6 hours.

In some embodiments, operation 102 may be performed for multiple exchange stations, enabling an EV to select an exchange station based on available battery data. For example, in some embodiments, the EV may receive information that a first battery exchange station close to a planned route only has a single poorly-rated battery available for exchange, while a second battery exchange station farther from the planned route has several batteries available for exchange. The EV may opt to continue with performing method 100 with respect to the second battery exchange station.

Method 100 further comprises determining a candidate exchange at operation 104. Operation 104 may include, for example, identifying one or more batteries owned by the EV, a user who owns the EV, a user leasing the EV, etc. (referred to as "owned batteries"). Operation 104 may further include identifying one or more exchange station batteries to be exchanged for the owned batteries. Operation 104 may include determining a relatively fair exchange, such as by selecting batteries for exchange that have relatively similar ratings. For example, an EV may determine that exchanging three owned batteries for three exchange station batteries is fair. The EV may select a first owned battery having a depleted charge (e.g., 20%) and a first rating (e.g., 15,000 miles travelled) to be exchanged for a first exchange station battery having a maximum charge (e.g., 100%) and a second rating similar to the first rating (e.g., 15,050 miles travelled).

For example, the first owned battery may be relatively new, with high-quality pores, and have undergone fewer than ten charge cycles. Thus, the EV may analyze the data received at operation 102 in order to determine a viable candidate battery to exchange for the first owned battery. For example, the first exchange station battery described above may have a 100% charge, but may also be relatively old, having pores in a "D-grade" state (meaning the pores are substantially frayed), having undergone over one hundred charge cycles and traveled for 150,000 miles. The second exchange station battery described above may have a 100% charge, may have travelled for 10,000 miles, and may have pores in an "A-grade" state. In such an example, even though both the first exchange station battery and the second exchange station battery may be fully charged and sufficient for the EV to reach a destination, operation 104 may include determining that an exchange of the first owned battery for the second exchange station battery may be the most fair, because the second exchange station battery is closer than the first exchange station battery in quality and/or value to the first owned battery. In some embodiments, operation 104 may include proposing the exchange to the exchange station. In some embodiments, the exchange station may propose an exchange, in addition to or instead of that proposed by the EV.

In some embodiments, exchanges proposed as part of or as a result of operation 104 may be limited to interchangeable batteries. For example, a first owned battery may be compatible with a first EV battery slot, while a first exchange station battery may not be compatible with the first EV battery slot. In such an example, operation 104 may include proposing an exchange of the first owned battery for a different exchange station battery that is compatible with the first EV battery slot, even if the first exchange station battery is otherwise a "more fair" exchange (e.g., even if the first exchange station battery's rating is closer to the first owned battery's rating). However, some EVs may have multiple different types of battery slots and thus support a variety of batteries. Thus, in some embodiments, exchanges of batteries that are not directly interchangeable may be possible.

Method 100 further comprises verifying a state of an exchange station battery at operation 106. The exchange station battery being verified may be a candidate for exchange (e.g., may be listed in an exchange determined at operation 104). Operation 106 may include, for example, subjecting the exchange station battery to an ultrasonic test to evaluate a state of pores in the exchange station battery. For example, an exchange station battery may have a rating indicating that the exchange station battery has "A-grade" (e.g., like-new) pores. This battery may a candidate for an exchange determined at operation 104. The state of the pores of the battery may thus be tested at operation 106 to confirm that the rating is accurate. If results of the test indicate that the exchange station battery has "A-grade" pores (consistent with the rating), the exchange may proceed as planned. If, however, results of the test indicate that the exchange station battery has "C-grade" (e.g., substantially worn/frayed) pores, then the exchange may be cancelled. In some embodiments, a threshold margin of testing error may be permitted (e.g., strict matches with the rating may not be required in order to proceed with an exchange). In some embodiments, if the test results differ significantly from the rating, the test may be repeated to account for a possible outlier.

In order to allow an EV or user to test the exchange station battery, operation 106 may include temporarily receiving possession of the exchange station battery. The nature of the ultrasonic test is described in further detail below, with reference to FIG. 4. Other tests may also be performed as part of operation 106 such as, for example, capacitance tests, charge/discharge tests, visual evaluation, etc.

Method 100 further comprises comparing the verified evaluation to a threshold at operation 108. The threshold utilized in operation 108 may be (or be based on) the evaluation received at operation 102. In some instances, the threshold may be based on a preset minimum. If the evaluation meets or exceeds the threshold (108 "Yes"), method 100 further comprises approving the exchange at operation 112. Once an exchange is permitted, a user may deposit an owned battery with a battery exchange station and receive an exchange station battery in return. The owned battery may need to be uninstalled from an EV (such as removing it from a battery slot in the EV) prior to depositing the owned battery with the exchange station. Similarly, the received exchange station battery may need to be installed into the EV, such as by inserting it into a battery slot in the EV (which may or may not be the same slot the owned battery was previously in). Uninstallation, exchange, and/or installation of batteries may be performed with the usage of one or more automated systems, such as robotic arms, etc.

If the evaluation does not meet or exceed the threshold (108 "No"), method 100 further comprises rejecting the exchange at operation 110. Operation 110 may include, for example, transmitting a signal to a battery exchange station that the offered exchange has been rejected, proposing a counteroffer, etc.

Figure 2:
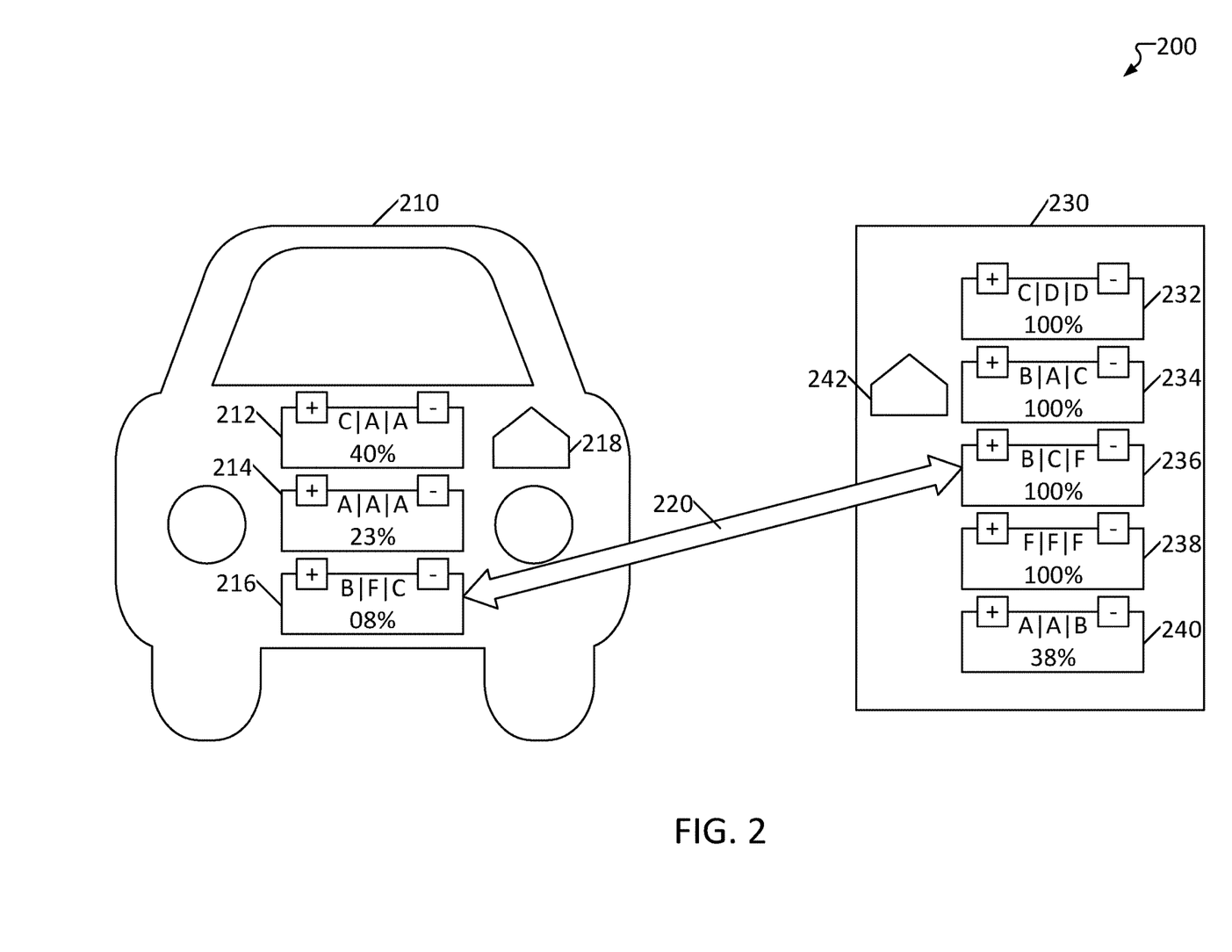
FIG. 2 is a diagram of an example system of batteries on which an automated battery exchange could be performed, consistent with several embodiments of the present disclosure.

FIG. 2 is a diagram of an example system 200 of batteries on which an automated battery exchange could be performed, consistent with several embodiments of the present disclosure. System 200 includes a vehicle 210 and an exchange station 230. Vehicle 210 may be, for example, an electric vehicle (EV). In some instances, vehicle 210 may be an ICE-Electric hybrid vehicle. Exchange station 230 may be, for example, an EV battery exchange station. Vehicle 210 includes a plurality of batteries, such as battery 212, battery 214, and battery 216 (collectively "batteries 212-216"), as well as battery tester 218. Exchange station 230 similarly includes a plurality of batteries, such as battery 232, battery 234, battery 236, battery 238, battery 240 (collectively "batteries 232-240"), as well as battery tester 242. Vehicle 210 and exchange station 230 are configured to perform an exchange of batteries, as indicated by arrow 220.

Each of batteries 212-216 and batteries 232-240 includes a rating and a charge level. This rating may describe several aspects of the rated battery. As an illustrative example, battery 216 has rating "B F C," representing letter grades in three different categories. For example, a first category may be a distance the battery has traveled, a second category may be a number of charge cycles the battery has undergone, while a third category may be a state of pores of the battery. Thus, the rating "B F C" may indicate that the battery has traveled a moderate distance (having a "B" rating), undergone a significant number of charge cycles (having an "F" rating) and has substantially frayed pores (having a "C" rating). Of course, these ratings could be arranged in any order, some categories could be omitted, and additional categories are also fully considered. Example additional categories include age, number of times the battery has been exchanged, maximum temperature the battery has reached, and the like. Battery 216 is also at 08% charge. The battery ratings may be maintained via a blockchain record, in order to preserve records of each battery's history. This may further enable evaluation of the battery's status.

Vehicle 210 may determine that a battery recharge or exchange is necessary. For example, vehicle 210 may receive a planned route and determine that its current battery charge is insufficient to complete the planned route. In response, vehicle 210 may determine that exchange station 230 has batteries available and request a list of available batteries and associated data. Vehicle 210 may then propose an exchange (indicated by arrow 220) to exchange station 230. In FIG. 2, arrow 220 represents a trade of battery 216 for battery 236. This is because battery 216 and battery 236, while not identical, are close in rating.

Many considerations are possible in determining a prospective candidate for exchange. In some embodiments, a threshold difference in battery charge is required. For example, while battery 214 is relatively similar in rating to battery 240, both batteries are below 40% charge. While such an exchange might be relatively fair, the EV is exchanging batteries in the first place in order to proceed on a journey without waiting to recharge. Thus, an exchange of battery 214 for battery 240, while fair, may not suit the purpose of the exchange in the first place. In some embodiments, if vehicle 210 is not yet present at exchange station 230, exchange station 230 may prioritize charging of battery 240 such that battery 240 is fully charged (or nearly fully charged) by the time vehicle 210 arrives at exchange station 230. In addition, either vehicle 210, exchange station 230, or both can have some minimum requirements that all batteries received as part of an exchange must meet. For example, exchange station 230 may have a policy to refuse acceptance of any batteries with any category rated "F." Such a policy would render exchange 220 unacceptable to exchange station 230, as battery 216 has an "F" rating in the second category.

As a perfect match between batteries having equivalent ratings is unlikely, vehicle 210 and exchange station 230 may be configured to "barter." For example, in some embodiments, a credit system may be implemented such that a user of vehicle 210 may accept an otherwise unfair trade (receiving an inferior battery in exchange for a superior-rated battery) and receive a predetermined amount of credit. Such credit could be redeemed during a subsequent transaction with exchange station 230 or another exchange station. In some embodiments, even if an equivalent exchange is possible, exchange station 230 may allow a user of vehicle 210 to agree to purchase a higher-rated battery in exchange for a lower-rated battery plus some amount of money (or credit). Multiple batteries may also be exchanged for single batteries.

At some point during exchange 220, vehicle 210 may evaluate battery 236 to verify the rating. For example, vehicle 210 may receive battery 236 and, using battery tester 218, test battery 236. Battery tester 218 may include a variety of sensors, including an ultrasonic test apparatus. Such an ultrasonic test is described in further detail below with regard to FIG. 4. Exchange station 230 may similarly test battery 216 using battery tester 242.

Figure 3:
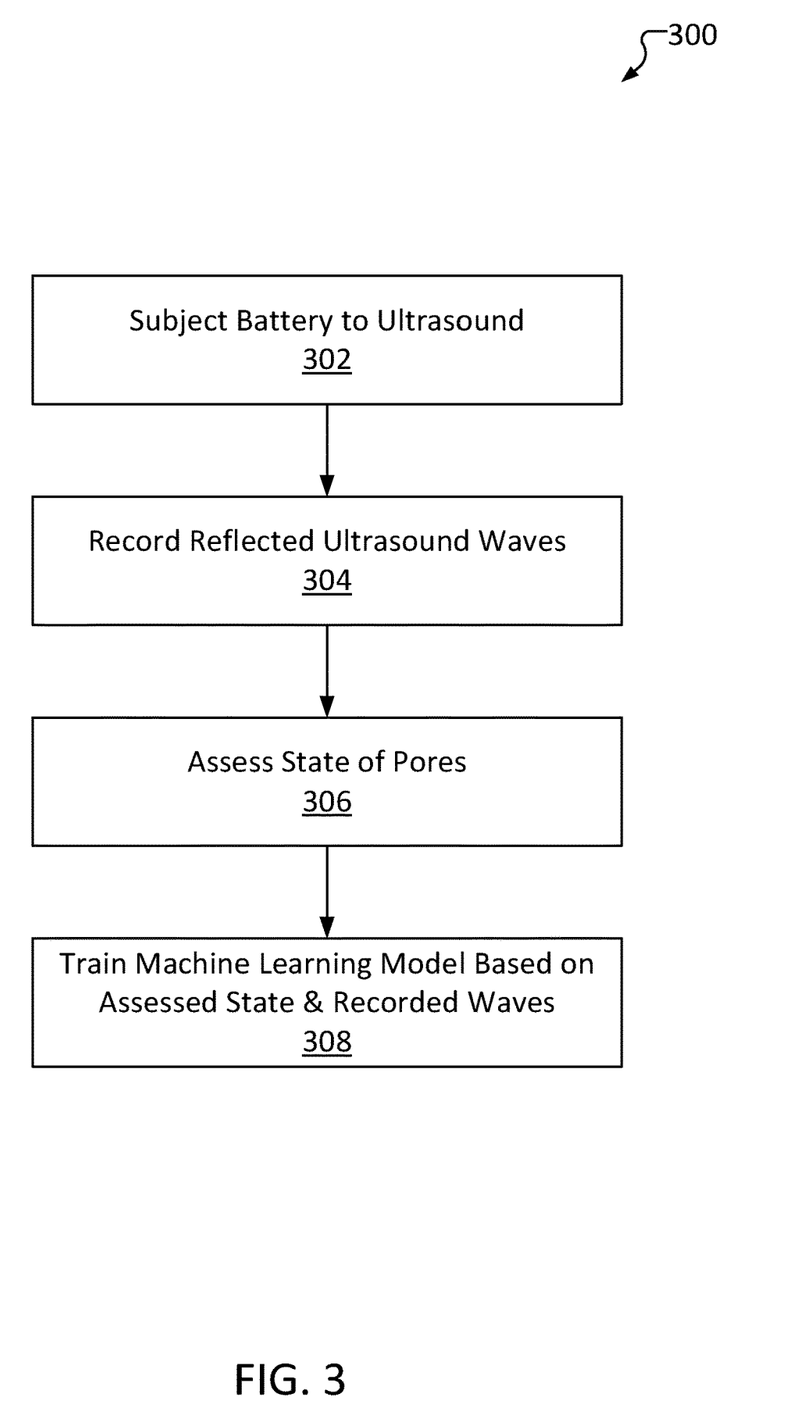
FIG. 3 is a high-level method for developing a nondestructive battery pore evaluation model to assess a state of pores of a battery based on recorded waves, consistent with several embodiments of the present disclosure.

FIG. 3 is a high-level method 300 for developing a nondestructive battery pore evaluation model to assess a state of pores of a battery based on recorded waves, consistent with several embodiments of the present disclosure. In particular, method 300 involves ultrasonic testing of battery pores.

Method 300 comprises subjecting a battery to ultrasonic waves at operation 302. Operation 302 may include, for example, emitting sound at a frequency above 20 kHz directed at the battery. The ultrasound waves may be emitted by one or more speakers. For example, in some instances, an array of speakers may be arranged in a grid (such as a rectangular grid) to emit ultrasonic waves. The grid of speakers may enable a standardized test method to improve reproducibility of the tests.

Method 300 further comprises recording ultrasound waves at operation 304. The re-emitted ultrasound waves being recorded may have passed through the battery and/or been reflected from internal surfaces (such as a separator membrane) within the battery. Operation 304 may be performed by one or more microphones configured to record at ultrasonic frequencies. Operation 304 may include, for example, recording amplitude and frequency of ultrasound waves with one or more microphones. In some instances, a plurality of microphones may be arranged to enable recording ultrasound waves exiting the battery from multiple locations. In some instances, a single microphone may be utilized. The recorded waves may be re-emitted from waves emitted at operation 302. For example, the recorded waves may have reflected from pores in a battery separator membrane. In some embodiments, operation 304 may include recording waves that have passed through the battery.

Method 300 further comprises assessing a state of pores of the battery at operation 306. Operation 306 may include, for example, disassembling the battery and visually evaluating a state of pores in a membrane of the battery. Operation 306 may include assigning a normalized rating to the state of the pores (e.g., rating from 1-10).

As an example, operation 306 may include a battery technician removing an outer casing of the battery, identifying a separator within the battery, and viewing pores in the separator. The viewing may require optical amplification. The rating can be standardized by, for example, taking a random sampling of pores in the membrane. For example, the technician may inspect all pores within a ten-square-millimeter region of the membrane, all pores in the entire membrane, the ten largest and ten smallest pores, etc. For each pore inspected, the technician may determine a state of the pore based on the perimeter of the pore. For example, a factory-new pore may be expected to have a regular and/or continuous perimeter, whereas a severely degraded pore may have a more jagged, irregular and/or discontinuous perimeter. The final rating of the pores may be based on, for example, a ratio of undamaged pores to degraded pores, a total count of degraded pores within a given region, etc. In some instances, the separator may be evaluated via strength testing, such as by measuring deformation, strain testing, etc.

Method 300 further comprises training, at operation 308, a machine learning model based on the assessed state & recorded ultrasonic waves. Operation 308 may include, for example, inputting a training dataset to a machine learning model. For example, the training dataset may include the ultrasound transmission of operation 302 and the ultrasound re-emitted ultrasound waves recorded at operation 304. Operation 308 may further include receiving an output from the machine learning model. The output may include a classification of a predicted state of the pores. For example, the machine learning model may output "1" corresponding to "factory new" pores, "9" corresponding to "significantly frayed pores," etc. Operation 308 may further include comparing the output received from the machine learning model to the state of the pores determined at operation 306. For example, a machine learning model output may identify that the pores are significantly degraded, while the state of the pores evaluated at operation 306 may have been an "8," indicating significant deterioration. As these values align, the output from the machine learning model is accurate. However, the state of the pores evaluated at operation 306 may have been a "3," indicating only slight deterioration. The difference between these values may indicate that the output of the machine learning model is inaccurate, suggesting that the model may require further training and adjustment. Operations 302, 304, and 306 may need to be repeated on multiple batteries to yield a set of training data of sufficient size to train a machine learning model. Operation 308 may further include training a machine learning model such as, for example, a convolutional neural network (CNN), recurrent neural network (RNN), etc.

Figure 4:
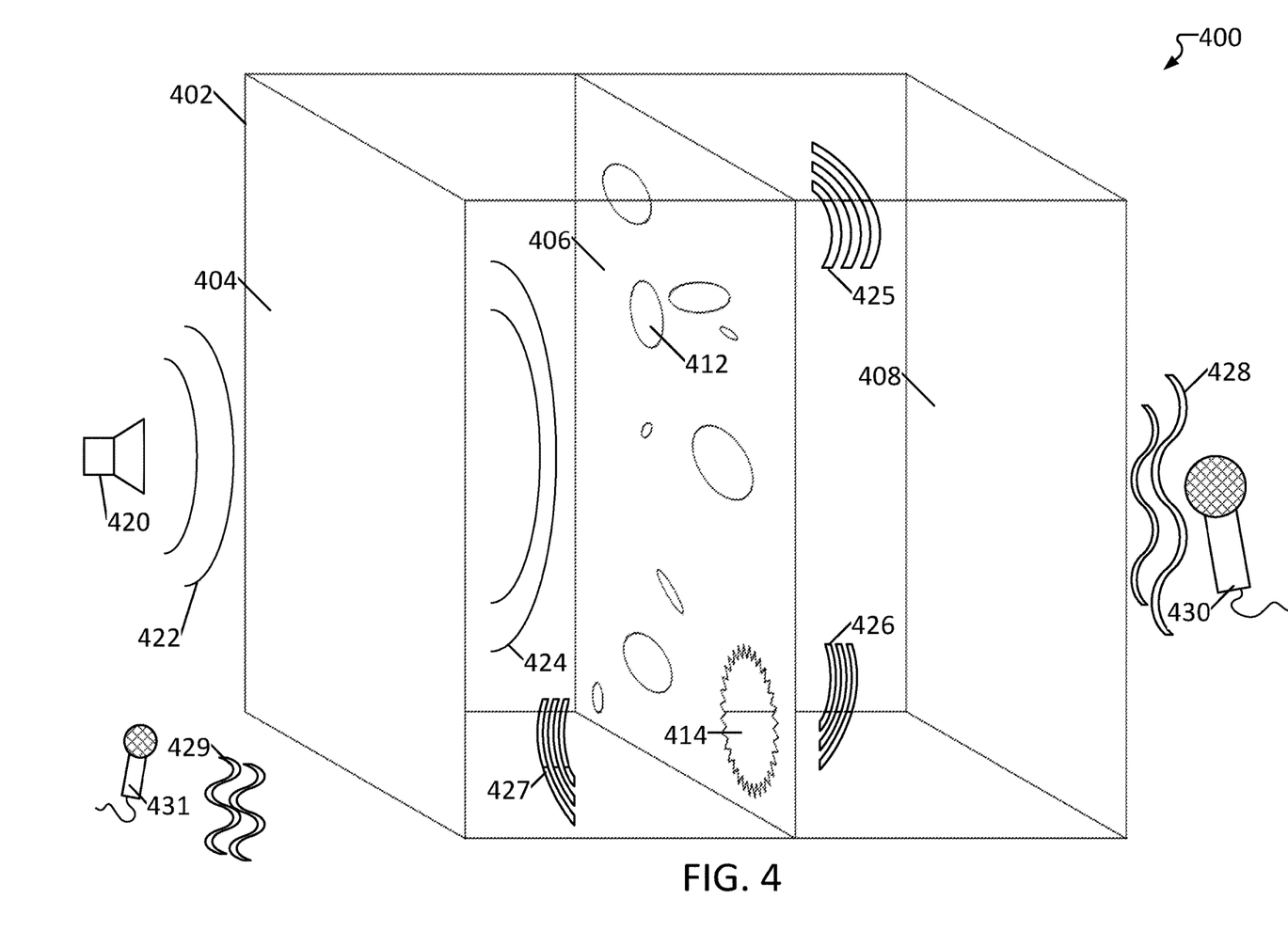
FIG. 4 is a diagram of an example battery pore evaluation test system, consistent with several embodiments of the present disclosure.

FIG. 4 is a diagram of an example battery pore evaluation test system 400, consistent with several embodiments of the present disclosure. System 400 includes battery 402, ultrasonic speaker 420, and microphone 430.

Battery 402 includes first electrode 404 and second electrode 408, separated by membrane 406. First electrode 404 could be either an anode or a cathode. Similarly, second electrode 408 could be either a cathode or an anode (so long as second electrode 408 is the opposite kind as first electrode 404). Membrane 406 includes a plurality of pores, such as pore 412 and pore 414. Notably, pore 414 is depicted in FIG. 4 as particularly frayed (as evidenced by pore 414 having an irregular boundary), while pore 412 is depicted in FIG. 4 as in relatively good condition (as evidenced by pore 412 having a smooth boundary).

Speaker 420 emits ultrasound waves 422, which are distorted as they pass through battery 402. For example, ultrasound waves 422 pass through first electrode 404, resulting in ultrasound waves 424. As ultrasound waves 424 pass through membrane 406, particularly through pores of membrane 406, such as pore 412 and pore 414, ultrasound waves 424 are distorted. Pores of membrane 406 will distort ultrasound waves 424 in different ways depending upon states of the pores. For example, distorted ultrasound waves 425, having passed through pores such as pore 412, may be different from distorted ultrasound waves 426. This may be because distorted ultrasound waves 426 have passed through different, more-frayed pores such as pore 414. Ultrasound waves 424 may also be reflected as reflected ultrasound waves 427.

Distorted ultrasound waves 425 and distorted ultrasound waves 426 may pass through second electrode 408, resulting in re-emitted ultrasound waves 428. Re-emitted ultrasound waves 428 may be recorded by microphone 430. The recorded re-emitted ultrasound waves 428 may be utilized in either training or as input to a machine learning model in order to evaluate an overall state of pores of battery 402.

In FIG. 4, microphone 430 is depicted as on an opposite side of battery 402 compared to speaker 410. Thus, in the embodiments depicted in FIG. 4, microphone 430 records ultrasonic waves that have passed through first electrode 404, membrane 406 (and pores of membrane 406), and second electrode 408. However, reflected ultrasound waves 427 are also distorted based on the state of the pores of membrane 406. Reflected ultrasound waves 427 will pass back through first electrode 404, resulting in re-emitted ultrasound waves 429. Microphone 431 may by positioned near speaker 410, such that microphone 431 may record re-emitted ultrasound waves 429. In some embodiments, speaker 410 and microphone 431 may be the same device (i.e., a speaker-microphone). In some embodiments, both microphone 430 and microphone 431 may be utilized. In some embodiments, more microphones (not pictured) may be utilized in addition to or instead of microphone 430 and/or microphone 431.

Non-destructive evaluation of the pores of a battery may provide for a relatively fast way to determine a battery's health, thus informing a decision of whether to accept the battery for exchange. However, while the state of pores of the battery is a useful indicator of battery health, other parameters (such as total distance travelled, number of charge cycles, etc.) can also describe battery health. As some of these parameters are difficult to evaluate in a short timespan, they may not be feasible to evaluate prior to an exchange. Thus, the values may be stored and updated over time to enable an EV to check whether the battery's state is acceptable for exchange. However, as the parties to the exchange may not necessarily trust one another, ratings of the batteries and associated data are stored in a blockchain. The blockchain's tamper-resistant distributed nature improves the ability to reliably verify history of the battery.

Figure 5:
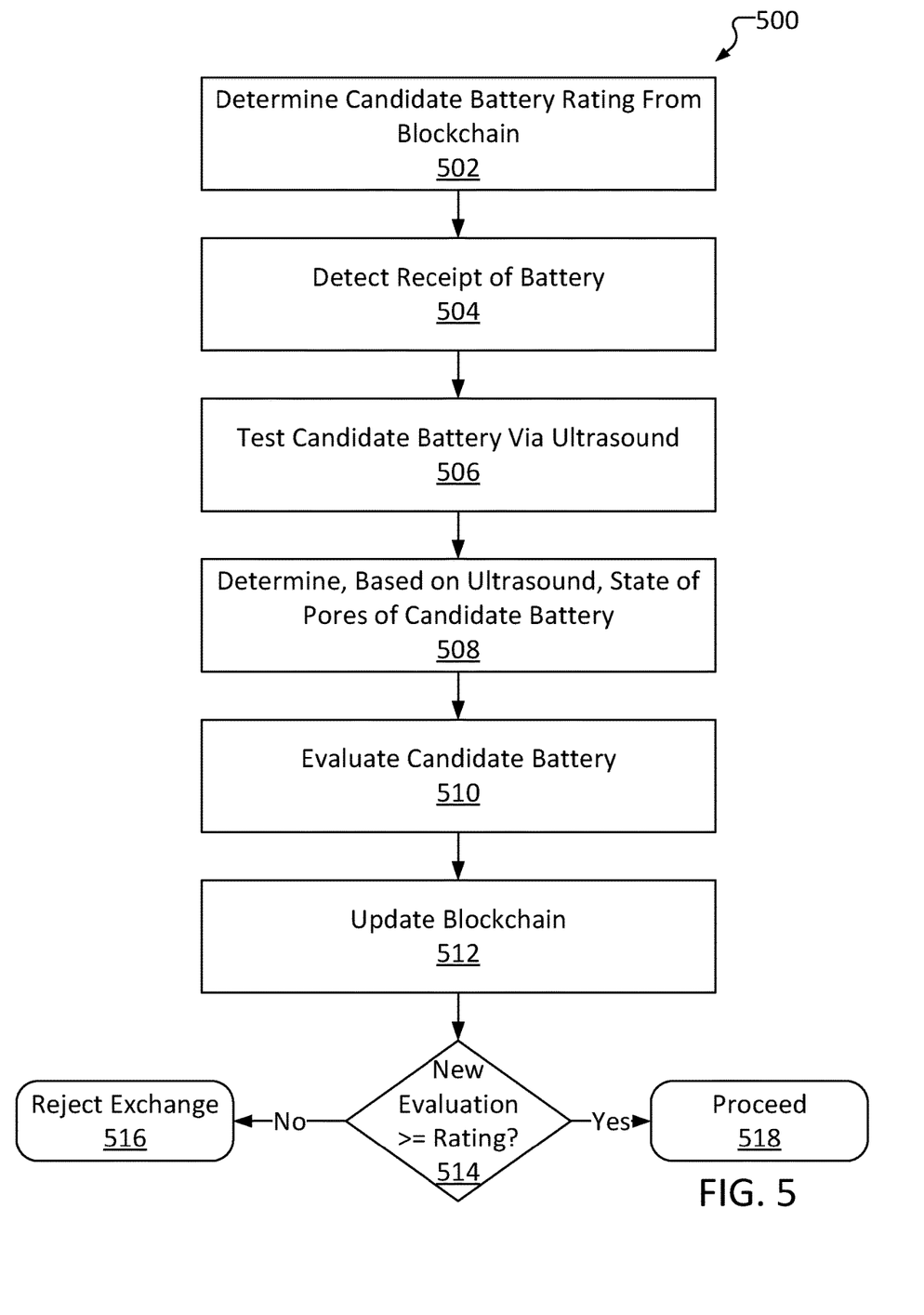
FIG. 5 is a method for evaluating a candidate battery prior to an exchange, consistent with several embodiments of the present disclosure.

FIG. 5 is a method 500 for evaluating a candidate battery prior to an exchange, consistent with several embodiments of the present disclosure. Method 500 may be performed by an electronic vehicle (EV) as part of an exchange of batteries at a battery exchange station. Method 500 comprises determining the candidate battery rating at operation 502. Operation 502 may include, for example, scanning a code (such as a QR code) affixed or imprinted on the candidate battery, accessing a computer system included with the candidate battery, and the like, in order to read a rating of the candidate battery from a blockchain. For example, each battery may have an associated blockchain including a list of entries. Each entry may include a rating (and an associated timestamp). Battery exchange stations and/or electric vehicles may evaluate each battery upon taking possession of the battery and add the rating to the battery's blockchain. For example, an EV manufacturer may, as part of the EV manufacturing process, evaluate each battery installed in a new EV and initialize (or add to) blockchains for each battery. Similarly, upon receiving a battery via exchange or otherwise, a battery exchange station may assign a rating to the battery and add the rating to the battery's blockchain.

Operation 502 may therefore include identifying the blockchain associated with the battery and access the most recent entry in order to determine a most recent rating. The rating may include a score or grade describing the state of the candidate battery. The rating may include one or more categories, such as an age of the candidate battery, a state of pores within the battery, and the like.

Method 500 further comprises detecting receipt of a "candidate" exchange station battery at operation 504. As used herein, a battery may be referred to as a "candidate" battery if it is being offered in exchange for an owned battery (or credit, etc.). Operation 504 may include detecting that the candidate battery has been received in a receptacle, such as a receptacle in a vehicle. In some embodiments, operation 504 may include receiving the candidate battery from an exchange station via one or more automated systems. In some instances, operation 504 may include locking the candidate battery in place for testing.

Method 500 further comprises testing the battery via ultrasound at operation 506. Operation 506 may include, for example, emitting ultrasound waves at the candidate battery and recording ultrasound waves re-emitted by the candidate battery. Operation 506 may be performed via, for example, a system such as system 400 as described above with reference to FIG. 4. Method 500 further comprises determining, based on the ultrasound test, a state of pores of the candidate battery at operation 508. Operation 508 may include, for example, utilizing the recorded re-emitted ultrasound waves as input to a machine learning model and receiving an output from the machine learning model. In some embodiments, operation 508 may include selecting a machine learning model from a plurality of stored machine learning models. The model may be selected based upon, for example, a manufacturer model of the battery. The output of the machine learning model may then be utilized to determine the state of the pores.

As an example, an EV considering whether to accept a candidate battery in exchange for an owned battery may implement an onboard testing apparatus. The candidate battery may be inserted into the apparatus. The apparatus may emit (via speakers) ultrasonic waves at the candidate battery and record (via microphones) a sound caused by the re-emitted ultrasonic waves. The recording may include determining frequency and amplitude of the waveform(s) representing the re-emitted waves. The recorded sound may be formatted based upon a machine learning model's input parameters. For example, a first machine learning model trained for a first manufacturer model of battery may require input in the form of a set of coordinates of a waveform in a frequency-amplitude spectrum. A second machine learning model (such as one trained for a second manufacturer model of battery) may require input in the form of a sound file (such as an .mp3 file, a .wav file, etc.).

Once the recorded sound is properly formatted, it is input into the appropriate machine learning model. The machine learning model may utilize the recorded sound by, for example, determining how the recorded sound is similar to and differs from previously-recorded sound associated with known-good batteries and known-bad batteries (e.g., the training datasets). Based on the nature of these similarities and differences, the machine learning model may estimate a current state of the pores of the candidate battery.

The output may be formatted in a variety of ways, depending upon the model. For example, a first machine learning model may output an estimated lifetime remaining of the battery. A second machine learning model may output a letter grade rating (e.g., "A"-"F"). The output of the model is used to evaluate the candidate battery.

Method 500 further comprises evaluating the candidate battery at operation 510. Operation 510 may include, for example, determining a new rating for the candidate battery based, at least in part, on the determined state of the pores. This new rating may be compared to the most recent rating (i.e., the rating identified at operation 502). This comparison serves to verify the accuracy of the most recent rating. For example, if the pores are determined (via operation 508) to be significantly frayed, operation 510 may include creating a new rating for the candidate battery with a "1" or "F" in a "pores" category. In some embodiments, the machine learning model may output the rating of the state of the pores directly, in which case operation 510 may simply utilize the output rating.

In some embodiments, operation 510 may further include testing and rating the candidate battery in additional categories, such as charge level, recharge/discharge rate, and the like. Depending upon embodiment, time efficiency may be an important factor in finalizing the exchange, in which case additional tests may be limited to those that can be performed relatively quickly, such as charge level. However, in some use cases, more time-intensive tests may also be performed (such as, for example, testing of charge/discharge rates) in order to more fully verify the rating of the candidate battery. In some embodiments, even in time-sensitive applications, more time-intensive tests may be performed even after an exchange has occurred, which may, for example, enable a user to make a warranty claim if the candidate battery is later found to be defective.

Method 500 further comprises updating a blockchain at operation 512. The usage of the blockchain may further reinforce trustworthiness of the system by impeding attempts to forge ratings. Operation 512 may include, for example, adding the newly-determined rating to the blockchain of the candidate battery. The blockchain entry may be "signed," including metadata describing the testing apparatus (such as the electric vehicle performing the test), time of test, and other conditions in order to provide context of the rating. This metadata may be useful in the event a particular testing apparatus is determined to be faulty; previous ratings from the faulty testing apparatus can be disregarded accordingly.

Method 500 further comprises comparing, at operation 514, the new evaluation (determined at operation 510) to the previous rating (determined at operation 504). Battery exchange stations and/or electric vehicles may evaluate each battery upon taking possession of the battery and add the rating to the battery's blockchain. Thus, in essence, operation 514 results in validation/verification that the candidate battery meets or exceeds the level of quality it is purported to have. In some instances, some deterioration is expected over time. Thus, a strict equivalence may not be enforced in all categories; for example, a candidate batteries pores may be evaluated as slightly worse than the previous rating. This difference may be compared to a threshold; if the deterioration is greater than expected or permitted, the candidate battery may be rejected. The threshold may depend upon category. For example, battery pores may slowly deteriorate over time, even if the battery is stored appropriately, while a stored battery may retain its charge level. A candidate battery's most recent rating may have been evaluated when the candidate battery was last exchanged, such as when a previous owner deposited the candidate battery with a battery exchange station. The most recent rating may indicate that the candidate battery's pores are in a "like-new" state. As the candidate battery has (ostensibly) been in storage since this previous rating, an evaluation that the pores are in a "slightly deteriorated" state may be acceptable, while an evaluation that the pores are in a "significantly frayed" state may not be acceptable. This may further prevent against falsification of the battery rating in addition to the confidence introduced by the use of the blockchain. As a more innocuous advantage, this check may simply serve as a way of confirming that the correct candidate battery is being considered; a battery having two drastically different ratings may serve as a flag to investigate the identity of the battery. Further, in some instances, method 500 (particularly operation 514) can be utilized to determine a level, extent, or nature of use a battery has been subjected to. For example, a rented battery may be tested upon being returned to determine whether a user has subjected the battery to extreme use (and whether the same battery is being returned).

In some instances, a stored battery may not be recharged until it has been reserved for exchange. In some instances, a stored battery may be recharged upon receipt, and kept at (or near) full charge.

In addition, as batteries may deteriorate during storage (particularly if stored improperly), an earlier rating may be obsolete by the time the battery is offered for exchange. This is particularly relevant if the most recent rating was assigned a long time ago; for example, if a battery has not been rated in over two years (determined by the timestamp in the blockchain entries), then the most recent rating may be unreliable.

In some embodiments, initial selection of a battery exchange station when planning a route may account for age of most recent ratings. For example, a first battery exchange station may offer batteries that are rated similarly to owned batteries, while a second battery exchange station may offer batteries that are rated slightly worse than owned batteries. However, the first battery exchange station may not have any batteries with a most recent rating that is less than two years old, while the second battery exchange station may have assigned new ratings to each battery within the last month. In such a situation, the first battery exchange station's batteries may be expected to have deteriorated significantly over the two years since the batteries were last evaluated, and thus the second battery exchange station's batteries, while seemingly worse, may be expected to be the superior option. This may not necessarily mean that the second battery exchange station should be selected, as other factors may need to be accounted for, such as distance from a desired route, user preferences, prices (if any) for non-equivalent exchanges, and the like. However, age of most recent ratings can be a useful factor in selecting a battery exchange station in the first place.

If the candidate battery is evaluated to have a rating lower than the previous rating (514 "No"), method 500 further comprises rejecting the exchange at operation 516. In some embodiments, operation 516 may further allow for a counteroffer, such as receiving the candidate battery in addition to a second battery, or in addition to some form of credit. In some embodiments, a counteroffer may instead offer a different owned battery in exchange for the candidate battery. In some embodiments, a party may opt to test the candidate battery again to determine whether the test performed at operations 506-510 was erroneous.

In some embodiments, method 500 may only reject the exchange if the battery is evaluated to have a rating lower than the previous rating by a predetermined margin. For example, battery pores may be evaluated on a scale from "1" (lowest quality) to "10" (highest quality). In some instances, the rating scale may differ (e.g., 1 may be the highest quality, etc.). A comparison of a new rating to a previous rating may have an acceptable difference threshold of "2." A previous rating of a battery's pores may be "8," indicating relatively high quality. If a new rating, determined by an EV, of the battery's pores is "7," indicating good quality, the exchange may still be performed, as it is within the acceptable difference threshold. If, however, the new rating of the battery's pores is "2," indicating poor quality, the difference may be outside the acceptable threshold and thus the exchange may be rejected.

User preferences may also impact the decision at operation 514. For example, a user may specify that no exchanges may be performed if the candidate battery is rated worse than the owned battery. Further, a user may refine preferences based on category. For example, a user may specify that no exchanges may be performed if the candidate battery's pores are rated worse than the owned battery's pores, but exchanges wherein the candidate battery has undergone more charge cycles than the owned battery are acceptable.

If the candidate battery meets or exceeds its previous rating (514 "Yes"), method 500 further comprises proceeding with the exchange at operation 518. In some embodiments, operation 518 may include performing the exchange automatically. In some embodiments, operation 518 may include providing a notification to a user that the candidate battery has been verified, and prompting the user for final approval regarding whether the user wishes to execute the exchange.

In some embodiments, rather than compare the new rating to a previous rating, a system performing method 500 may compare the new rating to an acceptability threshold. For example, if the candidate battery is evaluated at operation 508 to meet a minimum standard set by a user, the candidate battery may be accepted for exchange regardless of a previous rating of the candidate battery. In some instances, an offer of an owned battery and some amount of credit may be adjusted based on a difference between the rating of the owned battery and the new rating of the candidate battery. Method 500 can be an automated method, run at periodic intervals and on-demand.

Figure 6:
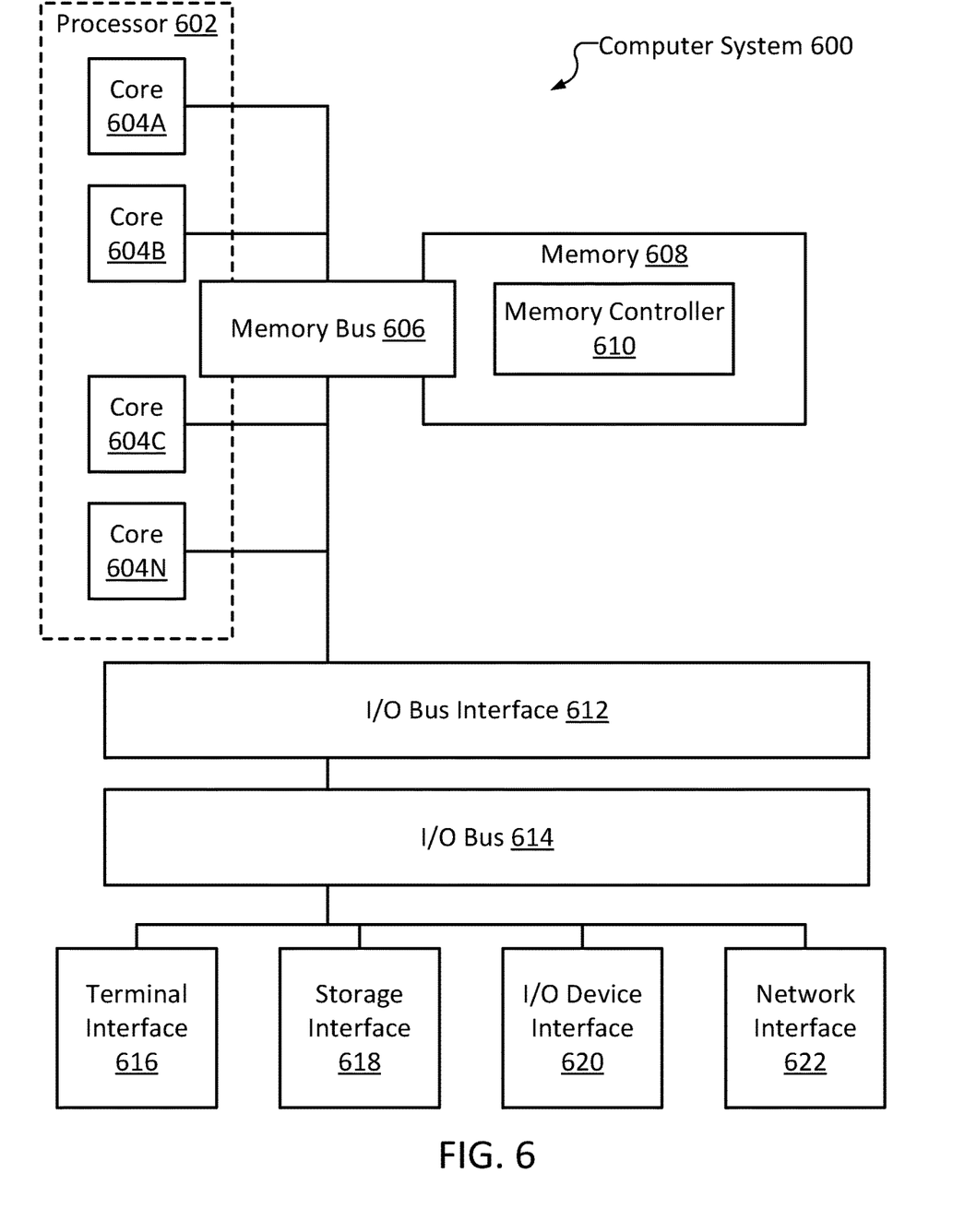
FIG. 6 is a high-level block diagram of an example computer system that may be used in implementing embodiments of the present disclosure.

FIG. 6 is a high-level block diagram of an example computer system that may be used in implementing embodiments of the present disclosure. Referring now to FIG. 6, shown is a high-level block diagram of an example computer system 600 that may be configured to perform various aspects of the present disclosure, including, for example, methods 100, 300, and/or 500. The example computer system 600 may be used in implementing one or more of the methods or modules, and any related functions or operations, described herein (e.g., using one or more processor circuits or computer processors of the computer), in accordance with embodiments of the present disclosure. In some embodiments, the major components of the computer system 600 may comprise one or more CPUs 602, a memory subsystem 608, a terminal interface 616, a storage interface 618, an I/O (Input/Output) device interface 620, and a network interface 622, all of which may be communicatively coupled, directly or indirectly, for inter-component communication via a memory bus 606, an I/O bus 614, and an I/O bus interface unit 612.

The computer system 600 may contain one or more general-purpose programmable processors 602 (such as central processing units (CPUs)), some or all of which may include one or more cores 604A, 604B, 604C, and 604N, herein generically referred to as the CPU 602. In some embodiments, the computer system 600 may contain multiple processors typical of a relatively large system; however, in other embodiments the computer system 600 may alternatively be a single CPU system. Each CPU 602 may execute instructions stored in the memory subsystem 608 on a CPU core 604 and may comprise one or more levels of on-board cache.

In some embodiments, the memory subsystem 608 may comprise a random-access semiconductor memory, storage device, or storage medium (either volatile or non-volatile) for storing data and programs. In some embodiments, the memory subsystem 608 may represent the entire virtual memory of the computer system 600 and may also include the virtual memory of other computer systems coupled to the computer system 600 or connected via a network. The memory subsystem 608 may be conceptually a single monolithic entity, but, in some embodiments, the memory subsystem 608 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 608 may contain elements for control and flow of memory used by the CPU 602. This may include a memory controller 610.

Although the memory bus 606 is shown in FIG. 6 as a single bus structure providing a direct communication path among the CPU 602, the memory subsystem 608, and the I/O bus interface 612, the memory bus 606 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 612 and the I/O bus 614 are shown as single respective units, the computer system 600 may, in some embodiments, contain multiple I/O bus interface units 612, multiple I/O buses 614, or both. Further, while multiple I/O interface units are shown, which separate the I/O bus 614 from various communications paths running to the various I/O devices, in other embodiments some or all of the I/O devices may be connected directly to one or more system I/O buses.

In some embodiments, the computer system 600 may be a multi-user mainframe computer system, a single-user system, or a server computer or similar device that has little or no direct user interface but receives requests from other computer systems (clients). Further, in some embodiments, the computer system 600 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative major components of an exemplary computer system 600. In some embodiments, however, individual components may have greater or lesser complexity than as represented in FIG. 6, components other than or in addition to those shown in FIG. 6 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
   receiving available battery data, wherein:
      the available battery data includes a first rating of a first exchange battery; and
      the first rating describes a state of pores in the first exchange battery;
   verifying the state of pores of the first exchange battery via ultrasonic testing;
   verifying a state of pores of a first owned battery via ultrasonic testing; and
   determining, based on the available battery data, the verification of the state of pores of the first exchange battery, and the verification of the state of pores of the first owned battery, a first proposed exchange, wherein the first proposed exchange includes:
      offering a first owned battery in exchange for the first exchange battery; and
      performing the verification of the state of pores of the first exchange battery and the verification of the state of pores of the first owned battery prior to a decision to approve or reject the first proposed exchange.

2. The method of claim 1, wherein the verifying includes:
   subjecting the first exchange battery to emitted ultrasonic waves;
   recording ultrasonic waves re-emitted by the battery;
   determining, based on the recorded ultrasonic waves, a pattern of the recorded ultrasonic waves;
   comparing the pattern to a known pattern; and
   evaluating, based on the comparing, the state of the pores.

3. The method of claim 2, wherein the comparing is based on a machine learning model.

4. The method of claim 1, further comprising exchanging, based on the verifying and on the first proposed exchange, the first owned battery for the first exchange battery.

5. The method of claim 1, further comprising rejecting, based on the verification of the state of pores of the first exchange battery and the verification of the state of pores of the first owned battery, the first proposed exchange.

6. The method of claim 5, further comprising proposing a second proposed exchange of the first exchange battery and a second owned battery in response to the rejection of the first proposed exchange, wherein the second proposed exchange is based on the verification of the state of pores of the first exchange battery and a verification of the state of pores of the second owned battery.

7. The method of claim 5, further comprising proposing a second proposed exchange of a second exchange battery and a second owned battery in response to the rejection of the first proposed exchange, wherein the second proposed exchange is based on a verification of the state of pores of the second exchange battery and a verification of the state of pores of the second owned battery.

8. The method of claim 1, wherein the receiving includes accessing a blockchain associated with the first exchange battery.

9. The method of claim 1, further comprising adding an entry to a blockchain associated with the first exchange battery, the entry based on the verifying.

10. A method, comprising:
    emitting, via a speaker, first ultrasonic waves into a first exchange battery;
    recording, via a microphone, first ultrasonic waves re-emitted by the first exchange battery;
    determining a state of pores of the first exchange battery;
    training, based on the first re-emitted ultrasonic waves and the state of the pores of the first exchange battery, a machine learning model;
    determining a state of pores of a first owned battery via ultrasonic testing; and
    determining, based on the verification of the state of pores of the first exchange battery and the verification of the state of pores of the first owned battery, a first proposed exchange, wherein the first proposed exchange includes:
       offering a first owned battery in exchange for the first exchange battery; and
       performing the verification of the state of pores of the first exchange battery and the verification of the state of pores of the first owned battery prior to a decision to approve or reject the first proposed exchange.

11. The method of claim 10, further comprising identifying, based on the first re-emitted ultrasonic waves and the state of the pores of the first exchange battery, a baseline distortion of the first exchange battery.

12. The method of claim 11, further comprising:
    emitting, via the speaker, additional ultrasonic waves into a second battery, the second battery having a same model as the first exchange battery;
    recording, via the microphone, additional ultrasonic waves re-emitted by the second battery;
    comparing, based on the baseline distortion, the additional re-emitted ultrasonic waves to the additional ultrasonic waves; and
    determining, based on the comparing, a state of pores of the second battery.

13. The method of claim 10, wherein the determining includes visually evaluating the state of pores of the first exchange battery.

14. A system, comprising:
    a memory; and
    a processor coupled to the memory, the processor configured to:
       receive available battery data, wherein:
          the available battery data includes a first rating of a first exchange battery; and
          the first rating describes a state of pores in the first exchange battery; and
       verify the state of pores of the first exchange battery via ultrasonic testing;
       verify a state of pores of a first owned battery via ultrasonic testing; and determine, based on the available battery data, the verification of the state of pores of the first exchange battery, and the verification of the state of pores of the first owned battery, a first proposed exchange, wherein the first proposed exchange includes:
offering a first owned battery in exchange for the first exchange battery; and
performing the verification of the state of pores of the first exchange battery and the verification of the state of pores of the first owned battery prior to a decision to approve or reject the first proposed exchange.

15. The system of claim 14, wherein the verifying includes:
subjecting, via a speaker, the first exchange battery to emitted ultrasonic waves;
recording, via a microphone, ultrasonic waves re-emitted by the battery; and
evaluating, based on the recorded ultrasonic waves, the state of the pores.

16. The system of claim 15, wherein the evaluating is based on a machine learning model.

17. The system of claim 14, further comprising exchanging, based on the verifying and on the first proposed exchange, the first owned battery for the first exchange battery.

18. The system of claim 14, further comprising rejecting, based on the verification of the state of pores of the first exchange battery and the verification of the state of pores of the first owned battery, the first proposed exchange.

19. The system of claim 14, wherein the receiving includes accessing a blockchain associated with the first exchange battery.

20. The system of claim 14, wherein the processor is further configured to add an entry to a blockchain associated with the first exchange battery, the entry based on the verifying.

* * * * *